A-D CONVERSION SYSTEM

Filed Dec. 21, 1964 3 Sheets-Sheet 1

INVENTORS
Takeki Takarabe
Shoji Chikaraishi
BY
Hill, Sherman, Meroni, Gross & Simpson INVENTORS
Takeki Tararabe
Shoji Chikaraishi
BY
Hill, Sherman, Meroni, Gross & Simpson INVENTORS
Takeki Takarabe
Shoji Chikaraishi
BY
Hill, Sherman, Meroni, Gross & Simpson

United States Patent Office 3,503,064
Patented Mar. 24, 1970

3,503,064
A–D CONVERSION SYSTEM

Takeki Takarabe and Shoji Chikaraishi, Tokyo, Japan, assignors to Kabushikikaisha Tokyo Keiki Seizosho (Tokyo Keiki Seizosho Co., Ltd.), Tokyo, Japan, a corporation of Japan Filed Dec. 21, 1964, Ser. No. 420,037
Claims priority, application Japan, Sept. 4, 1964, 39/50,852
Int. Cl. H03k 13/04
U.S. Cl. 340—347 1 Claim

ABSTRACT OF THE DISCLOSURE

An analog-to-digital conversion system which allows for the compensation of a non-linear detecting element so as to produce an accurate system.

This invention relates to an A–D conversion (analog-to-digital conversion) system, and in particular to an A–D conversion system in which A–D conversion is carried out while compensating the non-linearity of a detecting element in the course of conversion of analog signals from the detecting element into digital signals.

According to measuring systems heretofore employed, when analog signals from detector or a signal generator are converted into digital signals a preamplifier is used so as to arrange at a certain level the signals from various detectors or signal generators, and when the output signals of such signal generator do not vary linearly in response to voltage or resistance variations caused due to a measured value such, for example, as temperature variations, a complicated circuit such as a secondary converter is provided to compensate the non-linearity. The signals, which have thus been made uniform, are then supplied to an A–D conversion circuit.

However, the conventional measuring systems have a disadvantage in that highly precise measurements cannot be performed due to drift and offset of the preamplifier, variations in the characteristics of an input circuit time constant and linearity thereof with the lapse of time and precision of the non-linearity compensation of the secondary converter, other than errors of the A–D converter circuit.

Accordingly, one object of this invention is to provide an A–D conversion system in which D–A conversion (digital-to-analog conversion) of signals from a detector or a signal generator is directly carried out and operations including the non-linearity compensation are simply performed with high precision Another object of this invention is to provide a simple and effective A–D conversion system comprising a circuit portion for directly performing a D–A conversion of signals delivered from a detecting element irrespective of resistance or voltage variations caused by the detecting element itself and a circuit portion for compensating the non-linearity of the detecting element, in which during the D–A conversion the non-linearity is compensated and an A–D conversion of such compensated amount is carried out at the same time without necessitating the use of a complicated secondary converter.

A further object of this invention is to provide an A–D conversion system in which a Wheatstone bridge circuit is formed with a detecting element or a signal generator, a group of D–A conversion measuring resistors, non-linearity compensating resistors and a proportional resistor and D–A conversion of the detected value is carried out together with the non-linearity compensation.

Another object of this invention is to provide an A–D conversion system in which a detector or a signal generator is incorporated in one arm of a Wheatstone bridge circuit and its output side is connected to a D–A converter and the non-linear distortion of the detector or signal generator is compensated during the operation of the D–A converter, thereby performing accurate digital measurements.

Other objects, features and advantages of this invention will be apparent from the following description taken in conjunction with the accompanying drawings, in which:

FIGURE 1 is a connection diagram illustrating an example of the system of this invention, which comprises a resistance-type D–A converting device formed by incorporating a thermal bulb, a group of D–A conversion measuring resistors, non-linearity compensating resistors for the thermal bulb and a proportional resistor into respective arms of a Wheatstone bridge circuit and a voltage-type D–A converting device having a thermo-electric couple as a detecting element, these D–A converting devices being changed over to carry out D–A conversion in accordance with their respective types;

The present invention can be practised in the resistance or voltage type in accordance with the kind of the detecting element or signal generator, and an example of this invention will hereinbelow be explained with reference to FIGURE 1 in which either one of the two types can be selected as desired.

Figure 1:
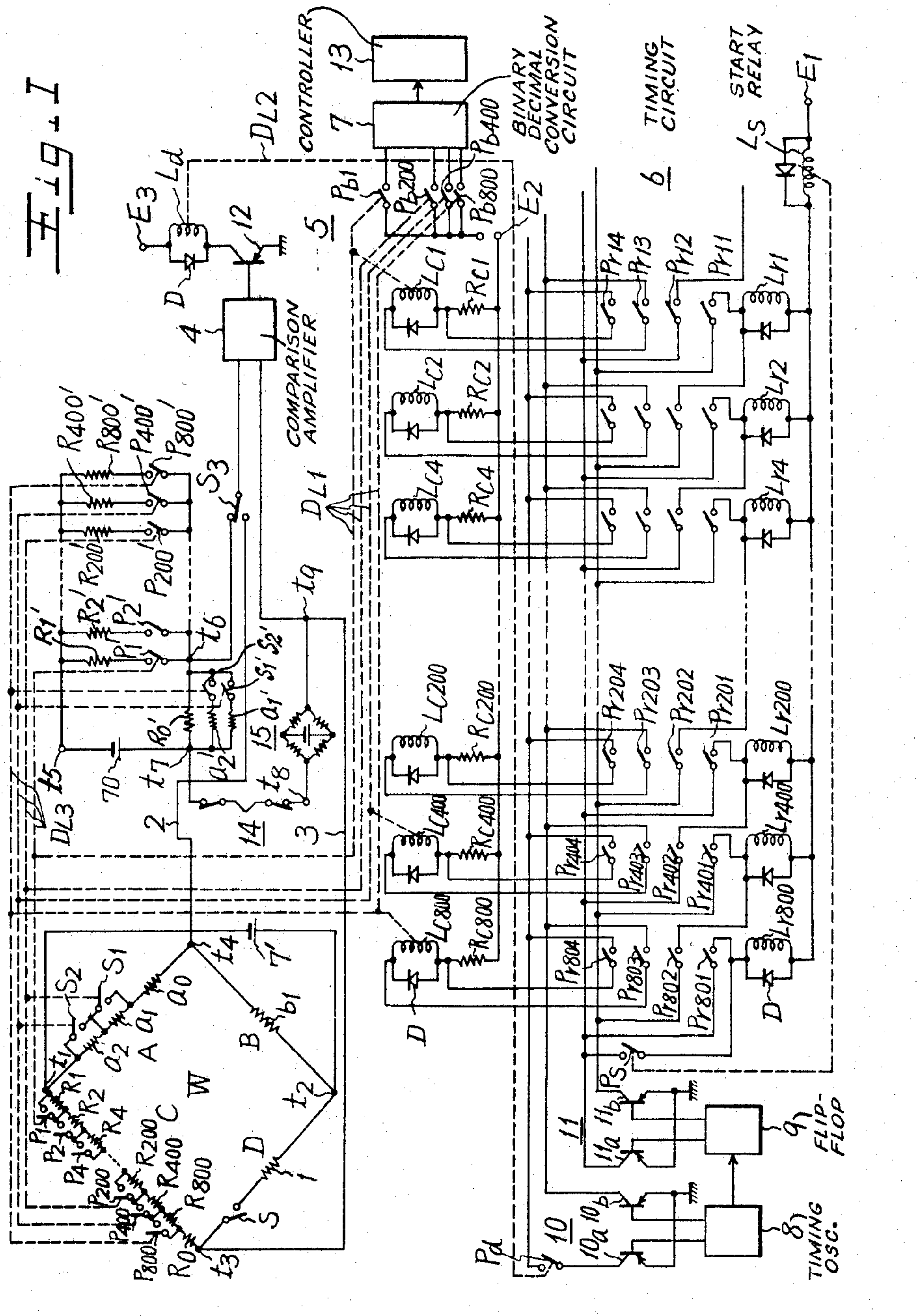

In FIGURE 1, 1 is a platinum thermal bulb used for, for example, temperature measurement and it has a resistance value of, for instance, 100Ω. The platinum thermal bulb 1 is inserted in one arm D of a Wheatstone bridge circuit W and a resistance-type D–A conversion circuit is formed which has arms A, B and C. That is, a power source 7 is connected between a pair of diagonal points $t_1$ and $t_2$ of the bridge circuit W and a comparison amplifier 4 is connected between another pair of diagonal points $t_3$ and $t_4$ through lead wires 2 and 3 and a switch $S_3$. Non-linearity compensating resistors for the thermal bulb 1 are incorporated into the arm A of the bridge circuit W, namely resistors $a_0$, $a_1$ and $a_2$ of, for example, 100Ω are connected in series and the resistors $S_1$ and $S_2$ respectively. A proportional resistor $b_1$ of 100Ω is incorporated into the arm B. In the arm C measuring resistors $R_1$, $R_2$, $R_4$, $R_8$, $R_{10}$, $R_{20}$, $R_{40}$, $R_{80}$, $R_{100}$, $R_{200}$, $R_{400}$, $R_{800}$ are connected in series with a base resistor $R_0$. The resistors $R_1$ to $R_{800}$ are respectively given in order of unit resistance values of 800, 400, 200, 100, 80, 40, 20, 10, 8, 4, 2 and 1 based upon the binary scale and short-circuit contacts $P_1$, $P_2$, $P_4$, $P_8$, $P_{10}$, $P_{20}$, $P_{40}$, $P_{80}$, $P_{100}$, $P_{200}$, $P_{400}$ and $P_{800}$ are provided which respectively correspond to the resistors $R_1$ to $R_{800}$. In practice, resistance variation of the platinum thermal bulb is generally .386Ω per 1° C., and hence the resistance values of the aforementioned resistors $R_1$ to $R_{400}$ are respectively selected in accordance with the following table.

| | |
|---|---|
| $R_1=0.386$ | $R_{40}=15.430$ |
| $R_2=0.772$ | $R_{80}=30.860$ |
| $R_4=1.542$ | $R_{100}=38.575$ |
| $R_8=3.086$ | $R_{200}=88.817$ |
| $R_{10}=3.858$ | $R_{400}=179.097$ |
| $R_{20}=7.715$ | $R_{800}=308.60$ |

The resistors $a_1$ and $a_2$ are used for non-linearity compensation as will be explained later and in the present example they show gradients at 200° C. and 400° C., and they have values of 65.75Ω and 118.26Ω respectively. A controller 5, for successively switching on and off the contacts $P_{800}$ to $P_1$ to thereby operate the contacts $S_2$ and $S_1$, and a timing circuit 6, for operating the controller 5, are provided. That is, the controller 5 consists of many relays $L_{c800}$, $L_{c400}$ . . . $L_{c4}$, $L_{c2}$ and $L_{c1}$ comprising contacts $P_{b800}$ . . . $P_{b3}$, $P_{b2}$ and $P_{b1}$ which drive conversion relays of the respective units of a binary-decimal conversion circuit 7 in response to the contacts $P_{800}$ to $P_1$ and the resistors $R_{800}$ to $R_1$. Since the binary-decimal conversion circuit 7 is a well-known one, its detailed connection is not illustrated in the drawing for the sake of simplicity. To facilitate better understanding of the operation, the relays and the contacts are connected by the dotted line $D_{L1}$.

The timing circuit 6 may be constituted in the form of the so-called ring counter, namely it includes relays $L_{r800}$, $L_{r400}$, $L_{r200}$ . . . $L_{r4}$, $L_{r2}$ and $L_{r1}$ respectively corresponding to the controller relays $L_{c800}$, $L_{c400}$, $L_{c200}$ . . . $L_{c4}$, $L_{c2}$ and $L_{c1}$. For operating the ring counter 6, a timing oscillator 8 and a flip-flop circuit 9 to be controlled thereby are provided. The timing oscillator may be constituted in the form of a multivibrator which produces a pulse of, for example, 10 c./s., the frequency of which pulse is reduced by half in the flip-flop circuit 9. On the output side of the timing oscillator 8 and the flip-flop circuit 9, a pair of transistor switches 10 and 11 are provided, through which the respective relays $L_{r's}$ of the ring counter 6 are operated in turn each for 0.1 second, thereby successively actuating the controller relays $L_{c's}$ respectively corresponding to the relays $L_{r's}$.

The relays $L_{r's}$ are provided with four contacts respectively and, for example, $L_{r800}$ has contacts $P_{r801}$, $P_{r802}$, $P_{r803}$ and $P_{r804}$ and $L_{r400}$ has contacts $P_{r401}$, $P_{r402}$, $P_{r403}$ and $P_{r404}$. In the like manner, the remaining relays of this kind are each provided with four contacts. Since the relays $L_{r800}$, $L_{r400}$, $L_{r200}$ . . . relays $L_{c800}$, $L_{c400}$, $L_{c200}$ . . . and their respective contacts are similarly connected to other parts, we will explan the relay $L_{r800}$ and its contacts $P_{r801}$, $P_{r802}$, $P_{r803}$ and $P_{r804}$ alone.

That is, one end of the relay $L_{r800}$ is connected through a contact $P_S$ of a start relay $L_S$ to one output side 11*a* of the transistor switch 11 and the other end is connected through the relay $L_S$ to the minus side of a power source $E_1$. The contact $P_{r801}$ is inserted in parallel with the contact $P_S$ and one end of the relay $L_{r400}$ is connected to the other output side 11*b* of the transistor switch 11 through the contact $L_{r802}$ formed late-break-type. The other end of the relay $L_{r400}$ is connected to the minus side of the power source $E_1$. The relay $L_{r200}$ is similarly connected to the output side 11*a* of the transistor switch 11 through the corresponding contact $P_{r402}$ of the relay $L_{r400}$ and to the minus side of the power source $E_1$. The other relays $L_{r's}$ are connected in the same manner. One end of the relay $L_{c800}$ is connected through the contact $P_{r803}$ to one output side 10*b* of the transistor switch 10 and the other end is connected through a resistor $R_{c800}$ to the minus side of a power source $E_2$. One end of the resistor $R_{c800}$ on the side of the relay $L_{c800}$ is connected to the other output side 10*a* of the transistor switch 10 through the contact $P_{r804}$ and a contact $P_d$ described later. The other relays $L_{c400}$, $L_{c200}$ . . . $L_{c2}$ and $L_{c1}$ and resistors $R_{c800}$ to $R_{c1}$ are connected substantially in the same manner.

To the output side of the comparison amplifier 4 is connected a transistor 12 and a relay $L_d$ is connected to the output side thereof, by which it is discriminated whether the relays $L_{c800}$ to $L_{c1}$ of the controller 5 must be held or reset. To perform this, the contact $P_d$ is provided on the output side 10*a* of the transistor switch 10 as connected by the dotted line $D_{L2}$. That is, the relay, for instance $L_{c800}$ is held or reset according as the voltage of the resistor $R_{c800}$ drops or not at the time of make of the contact $P_{r804}$ in response to make and break of the contact $P_d$. $E_3$ is a DC power source. It is preferred to connect diodes D in parallel to the aforementioned relays respectively so as to stabilize their operation.

The operation of the system of this invention will hereinafter be explained. When the switch $S_3$ is changed over from the position as illustrated in FIGURE 1 the terminals $t_3$ and $t_4$ of the Wheatstone bridge circuit W are connected to the input side of the comparison amplifier 4 and the switch S of the bridge circuit W is closed. At this time, the thermal bulb 1 is incorporated into the arm D of the bridge circuit W, which bulb varies its resistance value in response to temperature of a portion to be measured. Then, the resistance values of the thermal bulb 1 and the arm C at this time compared. The contacts $P_{800}$ to $P_1$ corresponding to the resistors $R_{800}$ to $R_1$ are normally closed.

When the contact $P_s$ is closed by the start relay $L_s$ the relay $L_{r800}$ is energized to close its contacts $P_{r801}$, $P_{r802}$, $P_{r803}$ and $P_{r804}$. It must be noted that the relays $L_{r800}$, $L_{r400}$, $L_{r200}$ . . . are energized in turn each for 0.1 second through the transistor switches 11*a* and 11*b*. In this case, the contact $P_{r801}$ remains closed for 0.1 second and immediately opens, but the contact $P_{r802}$ is of late-break type and still remains closed for a short period of time after the relay $L_{r800}$ has been deenergized. Hence, the relay $L_{r400}$ is similarly energized for 0.1 second through the contact $P_{r802}$, thereby closing the contacts $P_{r401}$, $P_{r402}$, $P_{r403}$ and $P_{r404}$, closing the contact $P_{r803}$, a current is applied to the relay $L_{c800}$ and the resistor $R_{c800}$ by the output of the transistor 10*b*. By the energization of the relay $L_{c800}$ the contact $P_{800}$ is opened. At this time, the bridge circuit W carries out measurements and applies the results to the comparison amplifier 4, in which the resistance values of the thermal bulb 1 and the resistor $R_{800}$ are compared. In case the resistance value of the resistor $R_{800}$ is greater than that of the thermal bulb 1 in this comparison, the relay $L_d$ of the discriminator is conducted to close its contact $P_d$. As a result of this, one end of the resistor $R_{c800}$ passing through the contact $P_{r804}$ is grounded to decrease the quantity of conduction to the relay $L_{c800}$, holding the relay $L_{c800}$ inoperative and closing again its contact $P_{800}$. Simultaneously with it, the contact $P_{b800}$ opens to keep the binary-decimal converter circuit 7 out of operation. Then, the relay $L_{r400}$ carries out similar operation and comparison. Also in this case, when the resistance value of the resistor $R_{400}$ exceeds that of the thermal bulb 1 the contact $P_{400}$ closes and the contact $P_{b400}$ opens. However, when the resistance value of the resistor, for example $R_{200}$ is less than that of the thermal bulb 1, the relay $L_d$, which is the discriminator, is inoperative and its contact $P_d$ opens. As a result of this, the relay $L_{c200}$ is conducted through the resistor $R_{c200}$ passing through the contact $P_{r204}$, actuating the relay $L_{c200}$ and holding its contact $P_{200}$ open. At the same time as this, the contact $P_{b200}$ closes and the binary-decimal converter circuit 7 operates.

Figure 2:
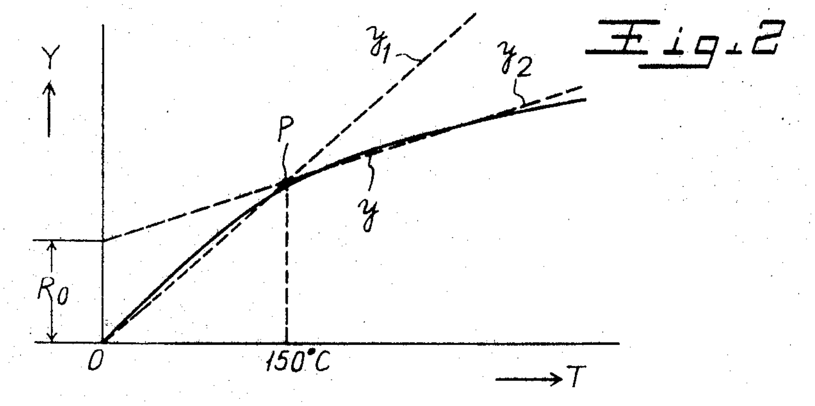
FIGURE 2 is a graph for explaining a temperature characteristic of the thermal bulb and compensation of its non-linearity.

Thus, the relays $L_{r800}$ to $L_{r1}$ operate one after another each for, for example, 0.1 second and the controller relays $L_{c800}$ to $L_{c1}$ also operate each for 0.1 second correspondingly. This operation is performed repeatedly. Accordingly, when any one of the resistance values of the resistors $R_{800}$ to $R_1$ exceeds that of the thermal bulb 1, its corresponding relay $L_c$ becomes inoperative to close again its corresponding contact which has once opened. The relays $L_T$'s succeeding the above-mentioned one, accordingly their corresponding relays $L_c$'s are held closed. On the contrary, when the resistance value of any one of the resistors R's is less than that of the thermal bulb 1 its corresponding contact opens and its corresponding resistor is connected to the bridge circuit W. Consequently, the sum of the resistance values of those which have been opened by a series of such operation of the ring counter among the contacts $P_{800}$ to $P_1$, equals the resistance value of the thermal resistor 1 and the binary-decimal converter circuit 7 is operated through contacts of those which have opened among the relays $L_c$'s, thereby indicating the temperature in a numerical value with an indicator 13.

Where temperature, which is an amount to be measured, is measured by using the thermal bulb in the temperature measuring circuit described above, the temperature characteristic of the thermal bulb is as shown by the curve $y$ in FIGURE 2 (the abscissa expressing temperature T and the ordinate response Y), and the resistance value of the thermal bulb 1 varies in a non-linear manner with respect to temperature. However, it can be expressed by asymptotes divided as desired in accordance with precision required. It can approximately be expressed by the straight lines $y_1$ and $y_2$ along the curve $y$ having a turning point P at the point of a temperature 150° C., for example. That is, $$y_1=a_1x+b_1$$
$$y_2=a_2x+b_2$$

where values of $a_1$ and $a_2$ are gradients of the curves $y_1$ and $y_2$. To determine them, it is sufficient only to change the values of $a_1$ and $a_2$ of the proportional arm A of the bridge circuit W. The values of $b_1$ and $b_2$ may be obtained by correcting or changing the D–A converting resistors on the arm C of the bridge circuit W. $R_0$ shows a base value that, for example, the straight line $y_2$ crosses the ordinate and it has been selected 100.3 in this example. That is, since $$C=\frac{A}{B}\cdot D$$

in the bridge circuit W shown in FIGURE 1, $a_1$ and $a_2$ are determined by the value of $A/B$ and in practice the values of the arm A are changed over successively in the process of comparison. In the present example a platinum thermal bulb of 100Ω is employed, so that a resistor of 100Ω is inserted into the arm B. Furthermore, for example, 150° C. is a reference and the straight lines $y_1$ and $y_2$ are considered to cross each other at this point. Therefore, the value of the resistor $a_1$ is selected to be 65.75Ω, which corresponds to 200° C., and its short-circuit contact $S_1$ is so designed as to operate together with the contact $P_{200}$. Similarly the value of the resistor $a_2$ is selected to be 118.26Ω, which corresponds to 400° C., and its short-circuit contact $S_2$ is also formed to operate together with the contact $P_{400}$. If now a temperature to be measured is 250° C., the contact $P_{400}$ of the relay $R_{c400}$ and the contact $S_2$ open in the aforementioned comparing operation but the resistors $R_{400}$ and $a_2$ are too great for 250° C., and hence the contacts $P_{400}$ and $S_2$ close immediately. Then, the contacts $P_{200}$ and $S_1$ open when the relay $R_{c200}$ operates. In this case, since the resistance value of the resistors $R_{200}$ and $a_2$ is smaller than that corresponding to 250° C., the relay $R_{c200}$ remains held and the contacts $P_{200}$ and $S_1$ remain open, thus carrying out the non-linearity compensation of the temperature.

We will explain an example in which the present invention has been applied to the voltage type measurement using a thermoelectric couple which produces temperature variations directly in the form of voltage. That is, 14 shows a thermoelectric couple and 15 its cold junction compensator. In this example, terminals of both ends of a DC power source 70 are designated at $t_5$ and $t_7$ and a terminal $t_6$ is connected through a resistor $R_0'$ to the terminal $t_7$. Between the terminals $t_5$ and $t_6$, there are connected in parallel D–A conversion circuit resistors $R_{800}'$ to $R_1'$ respectively corresponding to the aforementioned resistors $R_{800}$ to $R_1$, and contacts $P_{800}'$ to $P_1'$ are provided in series respectively with these resistors. These contacts correspond to the above-mentioned contacts $P_{800}$ to $P_1$ and perform the same operation. They are controlled by the relays $L_{c800}$ to $L_{c1}$ of the controller 5 as illustrated by the dotted lines $D_{L3}$. The value of the resistors is determined in accordance with that of the resistor $R_0'$ and the variation ratio of the voltage of a detector. Where the resistor $R_0'$ has a value of 3.070Ω and a CA thermoelectric couple is used, numerical values of the resistors $R_{800}'$ to $R_1'$, by way of example, are as given in the following table.

| | |
|---|---|
| $R_{800}'=0.9$KΩ | $R_{20}'=36.0$KΩ |
| $R_{400}'=1.8$KΩ | $R_{10}'=70.0$KΩ |
| $R_{200}'=3.6$KΩ | $R_8'=90.0$KΩ |
| $R_{100}'=7.2$KΩ | $R_4'=180.0$KΩ |
| $R_{80}'=9.0$KΩ | $R_2'=360.0$KΩ |
| $R_{40}'=18.0$KΩ | $R_1'=720.0$KΩ |

The thermoelectric couple 14 is connected between the terminals $t_7$ and $t_8$ and the cold junction compensator 15 is connected between terminals $t_8$ and $t_9$ in series with the thermoelectric couple 14. Thus, a circuit is formed which compares a voltage between the terminals of the resistor $R_0'$ and a voltage produced in the thermoelectric couple 14, and a difference voltage therebetween is impressed to the input side of the comparison amplifier 4. Furthermore, non-linearity compensating resistors $a_1'$ and $a_2'$, which are similar to those mentioned in the foregoing, are connected between the terminals $t_6$ and $t_7$ in parallel with the base resistor $R_0'$. Also in the voltage-type measurement, there is the non-linearity in the thermoelectric couple and its value varies with measured temperatures like in the aforementioned resistance-type measurement. To compensate the measured voltage of the D–A conversion circuit, a resistance value corresponding to $R_0'$ is changed. To perform this, the resistors $a_1'$ and $a_2'$ are incorporated into the circuit by means of contacts $S_1'$ and $S_2'$ respectively and their values represent gradients of straight lines which have approximated the characteristic curve of the thermoelectric couple. In the present example the resistors $a_1'$ and $a_2'$ are selected to be 75.47Ω and 121.4Ω respectively. The contacts $S_1'$ and $S_2'$, inserted in series to the resistors $a_1'$ and $a_2'$ respectively, are so formed as to be operated by, for example, the relays $L_{c400}$ and $L_{c800}$ respectively. Also in the voltage-type measurement a term $b$ is considered with respect to the formula previously mentioned as in the resistance-type measurement, but this can be obtained by compensating the resistance value at a predetermined position of the resistors $R_1'$ to $R_{800}'$.

The terminals $t_6$ and $t_9$ are connected to the input side of the comparison amplifier 4 and the switch $S_3$ is employed to select either the resistance-type measuring system or the voltage-type one as desired.

Also in the voltage-type measurement above described, the contacts $P_{800}'$ to $P_1'$ and $S_1'$ to $S_2'$ are successively changed over to carry out the comparing action and temperature is measured by the use of the thermoelectric couple, while compensating the non-linearity due to the thermoelectric couple.

Since similar operations are effected for both the voltage-type and resistance-type measurements as has been described in the foregoing, the operations for the voltage-type measurement can easily be understood from the previous explanation made in connection with the resistance-type measurement and its detailed explanation is omitted for the sake of brevity.

FIGURE 1 shows the resistance-type and voltage-type measuring circuits together, illustrating an example in which the two circuits are changed over by the switch $S_3$ and the comparison amplifier 4, the discriminator $L_d$, the controller 5, the timing circuit 6 and so on are used in common. However, either the resistance-type measurement or the voltage-type one can be independently used as required. In short, it will be seen that the present invention can be applied to both the resistance-type and voltage type measurements.

Figure 3:
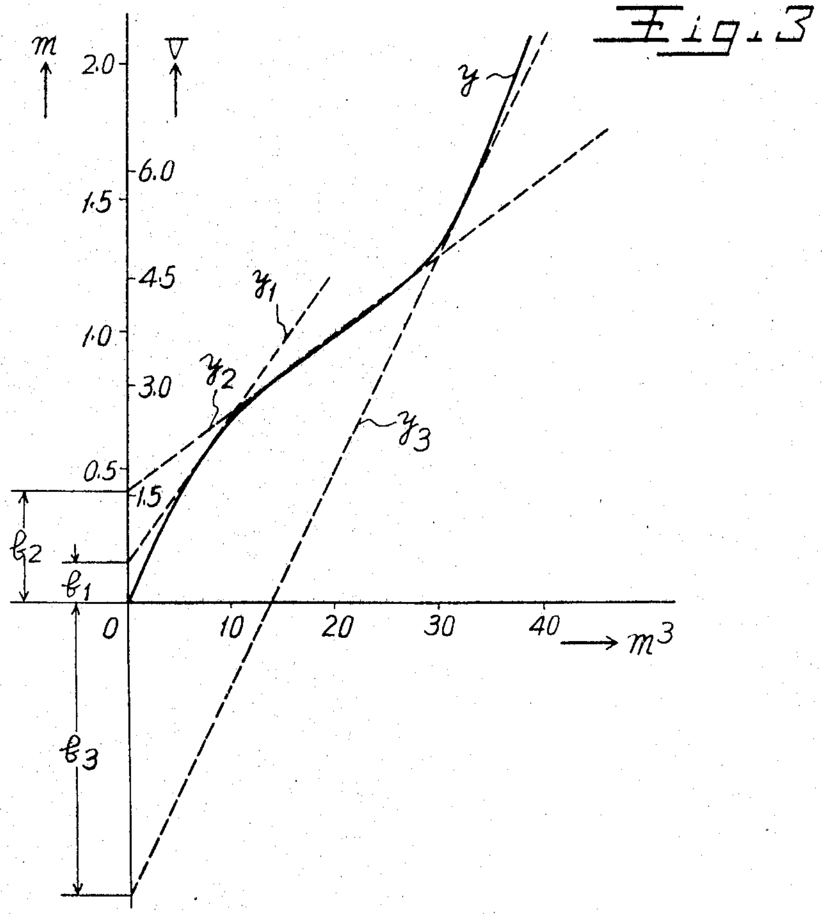
FIGURE 3 is a graph of characteristic curves illustrating the relationship of variations in the level of some liquid tank to those in capacity thereof, and for explaining that the characteristic curve of the tank can be approximated by three straight lines.

The foregoing has been made in connection with an example in which a non-linear line is approximated by two straight lines passing through a turning point. Then, we will explain a case where a non-linear line can be approximated by three asymptotes passing through two or more turning points. A liquid storage tann of, for example, ships is required to store liquid as much as possible in the smallest possible space, and hence the tank is never simple in shape and usually takes a specific shape in accordance with conditions of its location. This is an example in which a capacity value of such tank is computed from a measured level. FIGURE 3 illustrates a characteristic curve of a tank, the abscissa expressing indicating values of the tank capaicity in m.$^3$ and the ordinate the liquid level of the tank in meter and the output voltage V of a leveler corresponding thereto in volts. In such a case the tank shows an actual tank capacity curve such as shown by the full line $y$.

Figure 4:
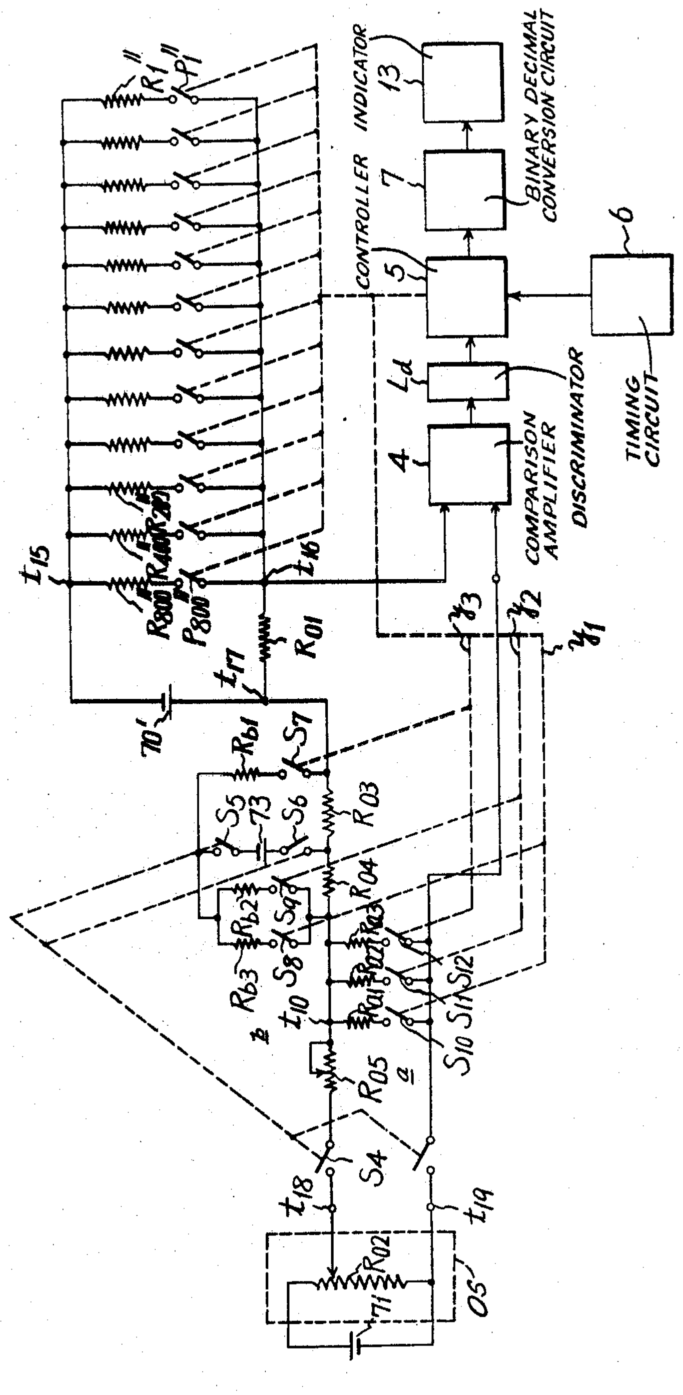
FIGURE 4 is a connection diagram illustrating an embodiment of this invention in which the capacity of the tank approximated by the three straight lines shown in FIGURE 3 is converted into a digital form.

This full-lined curve can be approximated by a plurality of dotted-lined asymptotes $y_1$, $y_2$ and $y_3$ drawn along the full-lined curve. That is, $$y_1=a_1x+b_1$$
$$y_2=a_2x+b_2$$
$$y_3=a_3x+b_3$$

where $b_1$, $b_2$ and $b_3$ respectively show distances between intersecting points of the straight lines with the ordinate and the origin O. Computation of a formula expressing such straight lines can be concretely accomplished by a circuit shown in FIGURE 4. In the figure $R_{800}''$ to $R_1''$ are resistors connected in parallel between terminals $t_{15}$ and $t_{16}$ and they are respectively given resistance values based upon the binary scale of 800, 400 . . . 4, 2 and 1. These resistors are switched on and off by contacts $P_{800}''$ to $P_1''$ connected in series thereto respectively and they are controlled by a controller 5 according to their respective positions as in the foregoing example. The terminals of a power source 70 are designated at $t_{15}$ and $t_{17}$, and a base resistor $R_{01}$ is connected between the terminals $t_{16}$ and $t_{17}$.

OS is an oscillator which produces voltage V corresponding to the liquid level of the tank, namely to the level and the oscillator is represented by a DC power source 71 and a variable resistor $R_{02}$ connected thereto. $a$ is a portion for determining the terms of $a_1$, $a_2$ and $a_3$ in the aforementioned formula and it comprises resistors $R_{a1}$, $R_{a2}$ and $R_{a3}$ and contacts $S_{10}$, $S_{11}$ and $S_{12}$ respectively connected in series to the resistors through a switch $S_4$ and a resistor $R_{05}$ connected in series to the output terminal $t_{18}$ of the oscillator OS, the resistors being connected in parallel to each other between terminals $t_{19}$ and $t_{10}$. At the next stage of the portion $a$, namely between the portion $a$ and a terminal $t_{17}$ a portion $b$ is provided for determining $b_1$, $b_2$ and $b_3$ in the foregoing formula. The portion $b$ comprises resistors $R_{03}$ and $R_{04}$ connected between the portion $a$ and the terminal $t_{17}$, a power source 73 connected to the connecting point of the resistors, switches $S_5$ and $S_6$ connected to the both ends of the power source, a resistor $P_{b1}$ and a switch $S_7$ respectively connected in series to the outer ends of the switch $S_5$ and the resistor $R_{03}$, parallel resistors $R_{b2}$ and $P_{b3}$ connected between the outer ends of the switch $S_5$ and the resistor $R_{04}$ switches $S_8$ and $S_9$ respectively connected in series thereto. The switches $S_4$, $S_5$ and $S_6$ are so formed as to operate together at the time of changing over the input.

The switches $S_7$ to $S_{12}$, inclusive, carry out make and break action in accordance with a sequence predetermined in the process of the binary action of the controller 5.

In the above example the values of the resistors $R_{01}$ and $R_{800}''$ to $R_1''$, inclusive, are respectively constant as shown in the following table and the input signal coming from the oscillator OS is approximated by straight lines in the course of the A–D conversion and a voltage across the resistor $R_{01}$ and an input signal voltage between the terminals $t_{17}$ and $t_{19}$ are compared. At this time the input signal is compensated. Of the three straight lines, $y_1$ covers a range from 0 to 9.9 cm.$^3$ and its gradient $a_1$ is determined by the resistance values of the resistors $R_{05}$ and $R_{01}$ and further the distance $b_1$ from the origin O is determined by a voltage across the resistor $R_{04}$. Since the resistors $R_{a1}$ and $R_{04}$ respectively produce voltages, the contacts $S_5$ and $S_6$ close as shown by the dotted line. In such a case, the contacts $S_5$ and $S_6$ have already closed as above described, and hence a current passing through the resistor $R_{04}$ is the same in direction and in polarity as a current passing through the resistor $R_{a1}$.

In like manner $y_2$ covers a range from 10 to 29.9 m.$^3$ and its gradient $a_2$ depends on the value of the resistor $R_{a2}$ and further $b_2$ is determined in accordance with a voltage of the resistor $R_{04}$ due to insertion of the resistor $R_{a2}$, caused by the closing of contact $S_9$. Its polarity is in the same direction as the signal, namely positive. Furthermore, $y_3$ covers a range of more than 30 m.$^3$ and its gradient $a_3$ is determined by the value of the resistor $R_{a3}$ due to the closing of the contact $S_{12}$. The distance $b_3$ depends upon a voltage of the resistor $R_{03}$ due to insertion of the resistor $P_{b1}$ caused by the closing of the contact $S_8$. The conducting direction of the resistor $R_{03}$ is opposite to that of the signal and this implies that it is inverse in polarity, namely it is in the position of $b_3$ below the origin.

The respective resistors forming the circuits $a$ and $b$ are given suitable values respectively in such a manner that the capacity value of the tank may be indicated in digital form when the voltage of the power source 70 is 10 volts, the value of the resistor $R_{01}$ is 10Ω, the resistors $R_{800}''$ to $R_1''$ are given predetermined values and the capacity of the tank is approximated by the three straight lines $y_1$, $y_2$ and $y_3$ correspondingly as above described. An example of their numerical values is given in the following table.

| | |
|---|---|
| $R_{01}$=10Ω | $R_{80}''$=2.5KΩ |
| $R_{02}$=100Ω | $R_{100}''$=2KΩ |
| $R_{03}$=10Ω | $R_{200}''$=1KΩ |
| $R_{04}$=10Ω | $R_{400}''$=0.5KΩ |
| $R_{05}$=3.3KΩ | $R_{800}''$=0.25KΩ |
| $R_1''$=200KΩ | $R_{a1}$=100Ω |
| $R_2''$=100KΩ | $R_{a2}$=170.9Ω |
| $R_4''$=50KΩ | $R_{a3}$=57Ω |
| $R_8''$=25KΩ | $R_{b1}$=649.4Ω |
| $R_{10}''$=20KΩ | $R_{b2}$=890Ω |
| $R_{20}''$=10KΩ | $R_{b3}$=3115Ω |
| $R_{40}''$=5KΩ | |

Some of the above resistors are provided with their respectively corresponding contacts or switches and these contacts or switches are respectively controlled by the relays $R_c$'s operated in accordance with the respective resistance values.

Since the above-described circuit portions for actuating the contacts in a predetermined order in this example are the same as those explained in connection with FIGURE 1, portions corresponding to those in FIGURE 1 are marked with the same numeral references.

With an arrangement described in the foregoing, the resistors $R_{800}''$ to $R_1''$ of the D–A conversion circuit for the binary operation are actuated in turn from higher units to lower ones by the A–D conversion operating signal from the timing circuit 6. Then, a terminal voltage produced in the resistor $R_{01}$ and an output voltage signal from the oscillator OS, namely a voltage produced between the terminals $t_{17}$ and $t_{19}$ are successively compared in response to the closing of the respective resistors, thus computing digital amounts. At this time the non-linearity compensation is carried out on the side of the signal simultaneously as described previously.

It will be apparent that many modifications and variations may be effected without departing from the scope of the novel concept of this invention.

What is claimed is:

1. An analog-digital conversion system comprising a detecting element for converting a monitored function into a voltage, a first resistor in series with a first terminal of said detecting element, a comparison circuit with one terminal connected to a second terminal of said detecting element, a first plurality of resistors and a first plurality of switches connected in series with said first plurality of resistors and the combination connected in parallel between the second side of the first resistor and the second terminal of said detecting element, a second plurality of resistors and a second plurality of switches in series with said second plurality of resistors and the combination connected to the second side of the first resistor and said second plurality of switches and said second plurality of resistors forming a second circuit, a power source connected to said second circuit, a second resistor connected in series between said second circuit and the one terminal of the comparison circuit, a third plurality of resistors and a third plurality of switches connected in series with the third plurality of resistors and the combination connected in parallel, a second power source connected to said third plurality of resistors, said third plurality of resistors connected to said comparison circuit, a discriminator connected to said comparison circuit, a controller connected to said discriminator and having relays which are connected to said first, second and third plurality of switches, a timing circuit connected to said controller, and an indicator connected to said controller to indicate the binary output of said detecting element.

References Cited

UNITED STATES PATENTS

| | | | |
|---|---|---|---|
| 3,237,186 | 2/1966 | Whelpley et al. | 340—347 |
| 3,239,833 | 3/1966 | Gray | 340—347 |
| 3,245,072 | 4/1966 | Fuller | 340—347 |
| 3,255,449 | 6/1966 | Euler | 340—347 |
| 3,274,586 | 9/1966 | Lapinski | 340—347 |
| 3,283,319 | 11/1966 | Kaneko | 340—347 |
| 3,316,751 | 5/1967 | Burk | 340—347 |

MAYNARD R. WILBUR, Primary Examiner

CHARLES D. MILLER, Assistant Examiner

U.S. Cl. X.R.

324—98

UNITED STATES PATENT OFFICE

CERTIFICATE OF CORRECTION

Patent No. 3,503,064 Dated March 24, 1970

Inventor(s) TAKEKI TAKARABE ET AL.

It is certified that error appears in the above-identified patent and that said Letters Patent are hereby corrected as shown below:

Column 2, line 57, after "resistors" should read --$a_1$ and $a_2$ are provided with short-circuit contacts--.

Column 7, line 16, "tann" should read --tank--.

Signed and sealed this 15th day of June 1971.

(SEAL)
Attest:

EDWARD M.FLETCHER,JR.
Attesting Officer

WILLIAM E. SCHUYLER, JR.
Commissioner of Patents